United States Patent [19]

Takahashi

[11] 3,887,770

[45] June 3, 1975

[54] DECODER APPARATUS ADAPTED FOR DIFFERENT 4-CHANNEL MATRIX SYSTEMS

[75] Inventor: Susumu Takahashi, Tokyo, Japan

[73] Assignee: Sansui Electric Co., Ltd., Tokyo, Japan

[22] Filed: Nov. 28, 1973

[21] Appl. No.: 419,527

[30] Foreign Application Priority Data

Nov. 30, 1972 Japan .............................. 47-120032

[52] U.S. Cl. ................... 179/1 GQ; 179/100.4 ST; 179/100.1 TD

[51] Int. Cl. .............................................. H04r 5/00

[58] Field of Search ............... 179/1 GQ, 100.4 ST, 179/100.1 TO, 15 BT

[56] References Cited

UNITED STATES PATENTS 3,783,192 1/1974 Takahashi ........................ 179/1 GQ 3,787,192 1/1974 Itoh ........................... 179/100.4 ST

*Primary Examiner*—Kathleen H. Claffy

*Assistant Examiner*—Thomas D'Amico

*Attorney, Agent, or Firm*—Harris, Kern, Wallen & Tinsley

[57] ABSTRACT

A decoder apparatus adapted for different four-channel matrix systems, wherein the sum and difference signals of two-channel composite signals are obtained by addition and subtraction respectively; an amplitude level ratio between the sum and difference signals is varied before addition and subtraction to obtain four-channel reproduced signals adapted for any of the different four-channel matrix systems. Where reproduction is to be effected according to one of the matrix systems, a sum signal and a difference signal used to reproduce rear signals are displaced 90° in phase by a phase shifter.

8 Claims, 2 Drawing Figures

DECODER APPARATUS ADAPTED FOR DIFFERENT 4-CHANNEL MATRIX SYSTEMS

Figure 1:
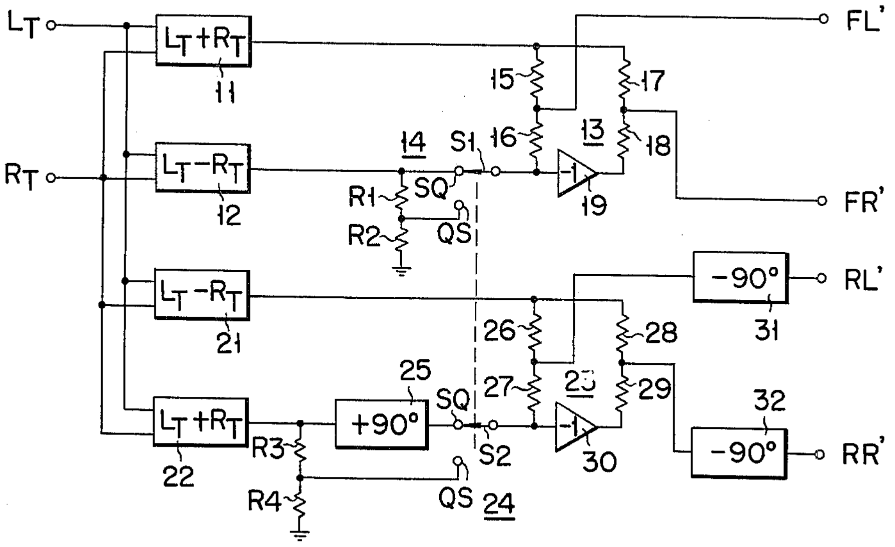

This invention relates to a decoder for a four-channel matrix system.

At present, two four-channel matrix systems are practically used. One of the systems is known as the QS type and the other as the SQ type. An apparatus for reproducing stereophonic records recorded by either QS or SQ system should be capable of effecting the reproduction in the form well matching both systems. If, however, the reproduction apparatus has to be provided with a separate decoder for each system, then it will result in a great economic disadvantage.

It is accordingly the object of this invention to provide a decoder apparatus adapted for different four-channel matrix systems by utilizing most of the required circuit arrangement in common.

According to an aspect of this invention, there is provided a decoder apparatus for decoding two-channel composite signals obtained by different four-channel matrix systems into four-channel signals in the form well matching any of said matrix systems comprising a first means connected to receive the two-channel composite signals for producing a sum signal; second means connected to receive the two-channel composite signals for producing a difference signal; third means connected to receive the sum and difference signals for additively combining the sum and difference signals to produce a first reproduced signal associated with one of front channels; fourth means connected to receive the sum and difference signals for subtractively combining the sum and difference signals to produce a second reproduced signal associated with the other of the front channels, fifth means for selectively varying an amplitude level ratio between the sum and difference signals supplied to said third and fourth means; sixth means connected to receive the two-channel composite signals for generating a difference signal; seventh means connected to receive the two-channel composite signals for a sum signal; eighth means connected to receive the sum signal from said sixth means and the sum signal from said seventh means for additively combining the sum and difference signals to obtain a third reproduced signal associated with one of rear channels; ninth means connected to receive the difference signal from said sixth means and the sum signal from said seventh means for subtractively combining the sum and difference signals to obtain a fourth reproduced signal associated with the other of the rear channels; tenth means for varying an amplitude lever ratio between the sum and difference signals conducted to said eighth and ninth means simultaneously with the switchover operation of said fifth means; and at least one first phase shifting means connected to or detached from the input sides of said eighth and ninth means along with the level switchover operations of said fifth and tenth means for introducing a predetermined relative phase difference between the sum and difference signals supplied to said eighth and ninth means.

Figure 2:
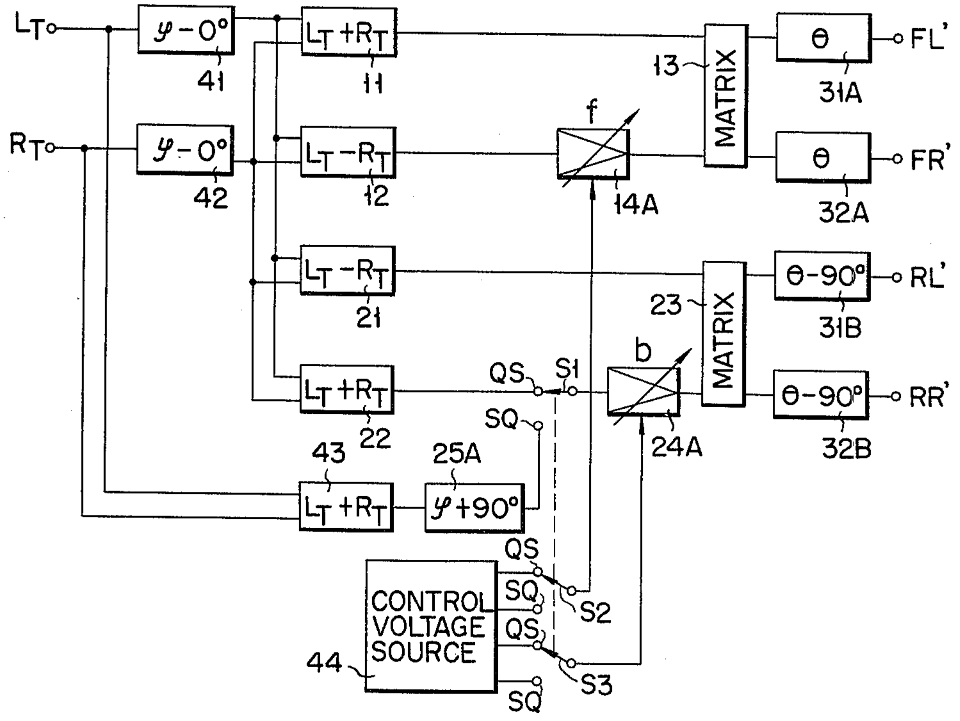

This invention can be more fully understood from the following detailed description when taken in conjunction with the accompanying drawing, in which:

FIG. 1 shows the circuit arrangement of a decoder according to an embodiment of this invention adapted for different four-channel matrix systems; and FIG. 2 indicates the circuit arrangement of a decoder according to another embodiment of the invention adapted for different 4-channel matrix systems.

There will now be described various signals associated with the QS and SQ matrix systems before referring to the decoder of this invention. Now let four-channel input signals be designated as FL (front-left), FR (front-right), RL (rear-left) and RR (rear-right). The two-channel composite signals $L_T$ and $R_T$ encoded by, for example, the QS system may be expressed as follows:

$$L_T = FL + 0.414FR + jRL + j0.414RR$$
$$R_T = FR + 0.414FL - jRR - j0.414RL$$

It will be noted that signals prefixed by the character $j$ have the phase shifted 90° relative to the other signals. 4-channel reproduced signals FL′, FR′, RL′ and RR′ obtained by decoding the above-mentioned two-channel composite signals $L_T$ and $R_T$ may generally be indicated as follows:

$$FL' = T + 0.414R_T = 1.17FL + 0.83FR + j0.83RL$$
$$FR' = R_T + 0.414L_T = 1.17FR + 0.83FL - j0.83RR$$
$$RL' = -j(L_T - 0.414R_T) = 1.17RL + 0.83RR - j0.83FL$$
$$RR' = +j(R_T - 0.414L_T) = 1.17RR+RR +0.83RL + j0.83FR$$

On the other hand, two-channel composite signals $L_T'$ and $R_T'$ encoded by the SQ system may be expressed as follows:

$$L_T' = FL + 0.7RR - j0.7RL$$
$$R_T' = FR + j0.7RR - 0.7RL$$

Four-channel reproduced signals FL″, FR″, RL″ and RR″ obtained by decoding the above-mentioned two-channel composite signals $L_T'$ and $R_T'$ may generally be indicated as follows:

$$FL'' = FL + 0.7RR - j0.7RL$$
$$FR'' = FR + j0.7RR - 0.7RL$$
$$RL'' = RL + j0.7FL - 0.7FR$$
$$RR'' = RR + 0.7FL - j0.7FR$$

There will now be described by reference to FIG. 1 the fundamental circuit arrangement of a decoder according to an embodiment of this invention. Two-channel signals $L_T$ and $R_T$ are supplied to first and second matrix circuits 11 and 12 to generate a sum signal $L_T + R_T$ and a difference signal $L_T - R_T$. The sum signal $L_T + R_T$ is supplied to a third matrix circuit 13 and the difference signal $L_T - R_T$ is conducted to the circuit 13 through a first amplitude level-varying means 14. The third matrix circuit 13 comprises an addition circuit consisting of series connected resistors 15 and 16 having an equal value to provide a reproduced signal FL′ and a subtraction circuit consisting of resistors 17 and 18 having an equal value and an inverter 19 all connected in series to generate a reproduced signal FR′. The reproduced signal FL′ is drawn out from the junction of the resistors 15 and 16 and the reproduced signal FR′ from the junction of the resistors 17 and 18. The amplitude level-varying means 14 includes a switch S1 and a voltage dividing circuit formed of resistors R1 and R2 connected in series.

The indicated condition of the switch S1 denotes reproduction by the SQ matrix system. In this case, the difference signal $L_T - R_T$ delivered from the second matrix circuit 12 is supplied intact to the third matrix circuit 13. When the switch S1 has its operation changed, the aforesaid reproduction by the SQ matrix system is switched over to that by the QS system. In this case, the difference signal $L_T - R_T$ drawn out of the second matrix circuit 12 has its voltage divided by the resistors R1 and R2. The resultant difference signal having its amplitude level reduced is conducted to the third matrix circuit 13. There are further provided fourth and fifth matrix circuits 21 and 22 producing a difference signal $L_T - R_T$ and a sum signal $L_T + R_T$ respectively upon receipt of two-channel composite signals $L_T$ and $R_T$. The difference signal $L_T - R_T$ is supplied intact to a sixth matrix circuit 23, and the sum signal $L_T + R_T$ is conducted to the sixth matrix circuit 23 through a second amplitude level-varying means 24 and a +90° phase shifter 25.

The sixth matrix circuit 23 comprises an addition circuit consisting of series connected resistors 26 and 27 having an equal value and a subtraction circuit consisting of resistors 28 and 29 having an equal value and an inverter 30 connected in series. A rear reproduced signal RL' is drawn out from the junction of the resistors 26 and 27 of the addition circuit through a −90° phase shifter 31. A rear reproduced signal RR' is delivered from the junction of the resistors 28 and 29 of the subtraction circuit through a −90° phase shifter 32.

The second amplitude level-varying means 24 includes a switch S2 interlocking with the switch S1 of the first amplitude level-varying means 14 and a voltage dividing circuit consisting of resistors R3 and R4. Where the switch S2 is in the indicated position admitting of reproduction by the SQ matrix system, then a sum signal obtained from the fifth matrix circuit 22 is supplied to the sixth matrix circuit 23 through the +90° phase shifter 25. On the other hand, where the switch S2 has its operation changed to convert reproduction by the SQ system to that by the QS system, then the sum signal $L_T + R_T$ has its voltage divided by the resistors R3 and R4. As the result, a sum signal having its amplitude level decreased is conducted to the sixth matrix circuit 23. In this case, the +90° phase shifter 25 is severed from the other elements.

The +90° phase shifter 25 is intended to introduce a relative phase difference of 90° between the difference signal $L_T - R_T$ from the fourth matrix circuit 21 and the sum signal $L_T + R_T$ from the fifth matrix circuit 22. The +90° phase shifter 25 may be replaced by a −90° phase shifter which is connected between the fourth matrix circuit 21 and sixth matrix circuit 23 only at the time of reproduction by the SQ system. Further, the −90° phase shifters 31 and 32 which are necessary to attain good reproduction by the QS matrix system may remain connected to the output side of the decoder at the time of reproduction by the SQ system, but without any practical obstruction. The switches S1 and S2 may consist of an electronic switch.

There will now be described the operation of the decoder of FIG. 1 first for reproduction by the SQ system and then for that by the QS system.

A front-left reproduced signal FL' drawn out of the addition circuit consisting of the resistors 15 and 16 at the time of reproduction by the SQ system may obviously be expressed as follows:

$$FL' = ½(L_T+R_T) + ½(L_T-R_T) = L_T = FL + 0.7RR - j0.7RL$$

And a front-right reproduced signal FR' delivered from the subtraction circuit consisting of the resistors 17 and 18 and the inverter 19 may be indicated as follows:

$$FR' = ½(L_T+R_T) - ½(L_T-R_T) = R_T = FR + j0.7RR - 0.7RL$$

The above-mentioned reproduced signals FL' and FR' are exactly the same as those obtained by the prior art SQ decoder.

A rear-left reproduced signal RL' generated from the addition circuit consisting of the resistors 26 and 27 included in the sixth matrix circuit 23 through the −90° phase shifter 31 may be expressed as follows: 8n $$\begin{aligned} RL' &= \{½(L_T-R_T) + ½j(L_T+R_T)\} \angle -90° = \\ &½\{L_T+jR_T-(R_T-jL_T)\} \angle -90° \\ &= ½\{-j1.4RL+RL+jFR-(1.4RL-jFL+FR)\} \angle -90° \\ &= ½\{2RL \angle -45°+1.4FL \angle +45°+1.4\ FR \angle +135°\} \angle -90° \\ &= \{RL \angle -45°+0.7FL \angle +45°+0.7FR \angle +135°\} \angle -90° \end{aligned}$$

A rear-right reproduced signal RR' given forth from the subtraction circuit consisting of the resistors 28 and 29 and inverter 30 through the −90° phase shifter 32 may be indicated as follows:

$$\begin{aligned} RR' &= \{½(L_T-R_T) - ½j(L_T+R_T)\} \angle -90° \\ &= ½\{L_T - jR_T - (R_T+jL_T)\} \angle -90° \\ &= ½\{1.4RR + FL - jFR - (j1.4RR+jFL+FR)\} \angle -90° \\ &= ½\{2RR \angle -45° + 1.4FL \angle -45° + \\ &1.4FR \angle -135°\} \quad -90° \\ &= \{RR \angle -45° + 0.7FL \angle -45° + 0.7FR \angle -135°\} \angle -90° \end{aligned}$$

The above-mentioned rear channel reproduced signals RL' and RR' are slightly different in terms of vector from those obtained from the prior art SQ decoder, but have the same composition and separation characteristics.

In the case of the reproduction for QS system, the difference signal $L_T - R_T$ obtained from the second matrix circuit 12 and the sum signal $L_T + R_T$ delivered from the fifth matrix circuit 22 have the voltage divided. Now let the voltage division of the difference signal $L_T - R_T$ be effected in the ratio of $f$(R2/R1+R2) and that of the sum signal $L_T + R_T$ in the ratio of $b$(R4/R3+R4). Then a front-left reproduced signal FL' drawn out of the addition circuit consisting of the resistors 15 and 16 at the time of reproduction by the QS system may be expressed as follows:

$$FL' = L_T + R_T + f(L_T+R_T) = (1+f)L_T + (1-f)R_T$$

A front-right reproduced signal FR' obtained from the subtraction circuit may be indicated as follows:

$$FR' = L_T + R_T - f(L_T-R_T) = (1+f)R_T + (1-f)L_T$$

Where, therefore,, the ratio of $1+f$ to $1-f$ is set at 1:0.414, namely, the voltage division ratio $f$ is chosen to be about 0.414, then the above-mentioned front-reproduced signals FL' and FR' will obviously be the same as the previously described QS reproduced signals.

A rear-left reproduced signal RL' given forth from the addition circuit through the −90° phase shifter 31 may be expressed as follows:

$$RL' = -j\ \{L_T-R_T+b(L_T+R_T)\} = -j\{(1+b)L_T-(-1-b)R_T\}$$

A rear-right reproduced signal RR' delivered from the subtraction circuit through the −90° phase shifter 32 may be indicated as follows:

$$RR' = -j\ \{L_T-R_T-b(L_T+R_T)\} = +j\{(1+b)R_T-(-1-b)L_T\}$$

Where, in this case, the ratio of $1+b$ to $1-b$ is set at 1:0.414, namely, the voltage division ratio $b$ is chosen to be about 0.414, then the above-mentioned rear signals RL′ and RR′ will be the same as the previously described QS rear reproduced signals.

The foregoing description will clearly show that the decoder of FIG. 1 can effectively act as the SQ or QS matrix decoder through the switchover operation of the switches S1 and S2.

FIG. 1 indicates only one phase shifter 25 for causing the difference signal $L_T - R_T$ and the sum signal $L_T + R_T$ associated with the rear channels to be displaced 90° in phase from each other. However, this arrangement fails to attain a fixed phase displacement of 90° over the entire audible frequency bands and in consequence good separation of the rear channels. The phase shifters 31 and 32 required for the QS matrix system are provided to prevent the rear reproduced signals RL′ and RR′ from presenting a reverse phase from each other. However, it is further demanded that a fixed phase displacement be realized between the front and rear reproduced signals over the entire audible frequency bands.

To meet the above-mentioned requirements, this invention provides another type of decoder shown in FIG. 2 which maintains good phase characteristics over the entire audible frequency bands and in which the amplitude level-varying means consists of a variable gain amplifier.

According to the embodiment of FIG. 2, the first to the fourth matrix circuits 11, 12, 21 and 22 are supplied with two-channel composite signals $L_T$ and $R_T$ through $\phi$—0° phase shifters 41 and 42 having the same phase characteristics. Connected between the second matrix circuit 12 and third matrix circuit 13 is a first variable gain amplifier 14A effecting amplification to an extent of $f$. Connected between the fifth matrix circuit 22 and sixth matrix circuit 23 are a switch S1 and a second variable gain amplifier 24A. There is further provided a seventh matrix circuit 43 for generating a sum signal $L_T + R_T$ upon receipt of two-channel signals L and R. At the time of reproduction by the SQ system, the sum signal $L_T + R_T$ is supplied to the second variable gain amplifier 24A through the switch S1 and the $\phi$+90° phase shifter 25A which carries out phase displacement to an extent 90° advanced from the phase characteristics of the phase shifters 41 and 42 over the entire audible frequency bands. Phase shifters necessary for reproduction by the QS system consist of $\theta$ phase shifters 31A and 32A connected to the output side of the third matrix circuit 13 and $\theta$—90° phase shifters 31B and 32B connected to the output side of the sixth matrix circuit 23, the latter phase shifters effecting phase displacement to an extent 90° delayed from the first mentioned phase shifters over the entire audible frequency bands.

The first and second variable gain amplifiers 14A and 24A have the degrees $f$ and $b$ of amplification controlled by control voltage supplied by a control voltage source 44 through the switches S2 and S3 respectively. The switches S1, S2 and S3 and interlockingly operated. Namely, where the decoder of FIG. 2 has its operation switched over for reproduction by the QS system, then the first and second variable gain amplifiers 14A and 24A are supplied with control voltage from a control voltage source 44 through the switches S2 and S3 respectively so as to effect amplification to an extent of about 0.414. Next where the decoder of FIG. 2 has its operation changed over to the SQ reproduction, then the first and second variable gain amplifiers 14A and 24A are supplied with such control voltage as sets the degrees $f$ and $b$ of amplification at about 1. The first and second variable gain amplifiers 14A and 24A may consist of, for example, a transistor and a field effect transistor connected parallel to the emitter resistor of the first mentioned transistor so as to act as a variable resistor. In this case, amplification by the first mentioned transistor is controlled by the control voltage impressed on the gate electrode of the field effect transistor.

According to the embodiment of FIG. 2, the phase shifters 41, 42 and 25A jointly act at the time of SQ reproduction to cause the difference signal $L_T - R_T$ and the sum signal $L_T + R_T$ associated with the rear channels to have the phase displaced to a fixed extent of 90° over the entire audible frequency bands. Therefore, separation between the rear reproduced signals can always be effected to an infinite extent over the entire audible frequency bands as in the prior art SQ decoder. Further at the time of QS reproduction, the phase shifters, 31A, 32A, 31B and 32B collectively act to cause the front and rear reproduced signals to be always displaced in phase to an extent of ±90° over the entire audible frequency bands.

For SQ reproduction, it is possible to provide $\phi$—0° phase shifters in place of the phase shifters 41 and 42 between the fourth matrix circuit 21 and sixth matrix circuit 23 so as to cause the difference signal $L_T - R_T$ and a sum signal $L_T + R_T$ to have the phase displaced to a fixed extent of 90° over the entire audible frequency bands through the cooperation of the phase shifter 25A. Further, the phase shifter 25A of FIG. 2 may be so disposed as to be connected to the output side of the second variable gain amplifier 24A by a separate switch interlockingly operable with the aforesaid switches S1, S2 and S3 only at the time of reproduction by the SQ system.

What is claimed is:

1. A decoder apparatus for decoding two-channel composite signals obtained by different four-channel matrix systems into four-channel signals in the form well matching any of said matrix systems comprising:

first means connected to receive the two-channel composite signals for producing a sum signal;

second means connected to receive the two-channel composite signals for producing a difference signal;

third means connected to receive the sum and difference signals for additively combining the sum and difference signals to produce a first reproduced signal associated with one of front channels;

fourth means connected to receive the sum and difference signals for subtractively combining the sum and difference signals to produce a second reproduced signal associated with the other of the front channels;

fifth means for selectively varying an amplitude level ratio between the sum and difference signals supplied to said third and fourth means in accordance with the type of the two-channel composite signals being decoded;

sixth means connected to receive the two-channel composite signals for generating a difference signal;

seventh means connected to receive the two-channel composite signals for generating a sum signal;

eighth means connected to receive the difference signal from said sixth means and the sum signal from said seventh means for additively combining the sum and difference signals to obtain a third reproduced signal associated with one of rear channels;

ninth means connected to receive the difference signal from said sixth means and the sum signal from said seventh means for subtractively combining the sum and difference signals to obtain a fourth reproduced signal associated with the other of the rear channels;

tenth means for varying an amplitude level ratio between the sum and difference signals supplied to said eighth and ninth means simultaneously with the ratio varying operation of said fifth means; and at least one first phase shifting means selectively connected in circuit or out of circuit with respect to the inputs to said eighth and ninth means simultaneously with the ratio varying operation of said fifth and tenth means such that when said first phase shifting means is in circuit one input to said eighth and ninth means is phase shifted with respect to the other input thereto and when said first phase shifting means is out of circuit it produces no relative phase shift of the input signals to said eighth and ninth means.

2. A decoder apparatus according to claim 1 wherein said fifth and tenth means respectively include a voltage dividing circuit.

3. A decoder apparatus according to claim 1 wherein said fifth and tenth means respectively include a variable gain amplifier.

4. A decoder apparatus according to claim 1 wherein said first phase shifting means is operative to introduce between the sum and difference signals a predetermined relative phase difference of substantially 90°.

5. A decoder apparatus according to claim 1 further comprising second and third phase shifting means connected to input sides of said first, second, sixth and seventh means for shifting the phases of the two-channel composite signals by a reference phase-shift angle; eleventh means connected to receive two-channel signals whose phases are not shifted for generating a sum signal; and means interlockingly actuated with the ratio varying operations of said fifth and tenth means for supplying said eighth and ninth means with the sum signal from said eleventh means in place of the sum signal from said seventh means, and wherein said first phase shifting means is operative to introduce between the difference signal from said sixth means and the sum signal from said eleventh means a relative phase difference which is different from the reference phase-shift angle by substantially 90°.

6. A decoder apparatus according to claim 1 further comprising:

second phase shifting means with the output of said eighth means connected as the input thereto; and third phase shifting means with the output of said ninth means connected as the input thereto.

7. A decoder apparatus for decoding two-channel composite signals obtained by different four-channel matrix systems into four-channel output signals comprising:

first means for additively combining sum and difference signals of the composite signals to produce a first output;

second means for subtractively combining sum and difference signals of the composite signals to produce a second output;

first gain control amplifier means connected to receive the difference signal of the composite signals which is applied to said first and second means;

third means for additively combining sum and difference signals of the composite signals to produce a third output;

fourth means for subtractively combining sum and difference signals of the composite signals to produce a fourth output;

second gain control amplifier means connected to receive the sum signal of the composite signals which is applied to said third and fourth means;

changing means for changing the gains of said first and second gain control amplifier in accordance with the type of the composite signals being decoded; and phase shifting means selectively connected in circuit or out of circuit with the inputs of said third and fourth means in association with operation of said changing means, said phase shifting means being operative to introduce a relative phase shift of substantially 90° between the sum and difference signals of the composite signals which are applied to said third and fourth means only when said phase shifting means is in circuit with said third and fourth means.

8. A decoder apparatus for producing two-channel composite signals $L_T$ and $R_T$ obtained by different four-channel matrix systems into four-channel output signals FL′, FR′, RL′ and RR′, said decoder apparatus comprising circuit means connected to receive the composite signals $L_T$ and $R_T$ for producing the four-channel output signals FL′, FR′, RL′ and RR′ which are substantially represented by $\{L_T+R_T+f(L_T-R_T)\}$, $\{L_T+R_T-f(L_T-R_T)\}$, $-j\{L_T-R_T+b(L_T+R_T)\}$ and $-j\{L_T-R_T-b(L_T+R_T)\}$, respectively, wherein $f$, and $b$ are variable coefficients and $j$ shows 90° phase shift;

changing means for changing values of said variable coefficients $f$ and $b$ in accordance with the type of the composite signals being decoded; and phase shifting means selectively connected in circuit or out of circuit with respect to said circuit means in association with the operation of said changing means, said phase shifting means being operative to introduce a relative phase shift of substantially 90° between sum and difference signals $(L_T+R_T)$ and $(L_T-R_T)$ of the composite signals $L_T$ and $R_T$ contained in the output signals RL′ and RR′ only when said phase shifting means is in circuit with said circuit means.

* * * * *

PO-1050
(5/69)

UNITED STATES PATENT OFFICE
CERTIFICATE OF CORRECTION

Patent No. 3,887,770 Dated June 3, 1975

Inventor(s) Susumu Takahashi

It is certified that error appears in the above-identified patent and that said Letters Patent are hereby corrected as shown below:

[56] Reference cited: "3,787,192" should be --3,787,622--

Column 2, line 20, "FI' = T + ..." should be --FL' = $L_T$ + ...--

Column 2, line 24, "1.17 R + RR + 0.83RL" should be
--...1.17RR + 0.83RL ...--

Column 4, line 11, after ":" delete --8n--

Column 4, line 45, "f($L_T$+$R_T$)" should be --f($L_T$-$R_T$)--

Column 5, line 58, "and" second occurrence should be -- are --

Signed and Sealed this

*ninth* Day of *September 1975*

[SEAL]

*Attest:*

RUTH C. MASON
*Attesting Officer*

C. MARSHALL DANN
*Commissioner of Patents and Trademarks*